(12) United States Patent
Miceli

(10) Patent No.: US 7,101,038 B2
(45) Date of Patent: Sep. 5, 2006

(54) MAKEUP EYEGLASSES

(76) Inventor: Sylvana Miceli, 40 Rock Spring Ave., West Orange, NJ (US) 07052

( * ) Notice: Subject to any disclaimer, the term of this patent is extended or adjusted under 35 U.S.C. 154(b) by 38 days.

(21) Appl. No.: 10/650,432

(22) Filed: Aug. 28, 2003

(65) Prior Publication Data
US 2005/0046785 A1 Mar. 3, 2005

(51) Int. Cl.
G02C 9/02 (2006.01)

(52) U.S. Cl. ............ 351/59; 351/111; 351/124
(58) Field of Classification Search ............ 351/41, 351/59, 111, 120, 124, 125
See application file for complete search history.

(56) References Cited

U.S. PATENT DOCUMENTS 2,374,171 A * 4/1945 Breuker, Jr. ............ 351/41
2,557,414 A * 6/1951 Coull ................. 351/111
3,840,294 A * 10/1974 Kneier ............... 351/59

* cited by examiner

Primary Examiner—Huy Mai

(57) ABSTRACT

The makeup eyeglasses are constructed with temples that are secured to the bottom of the lens frame. The temples are positioned below the area of the face to which makeup is to be applied and permit access from the side to the user's eyes end surrounding areas.

11 Claims, 2 Drawing Sheets

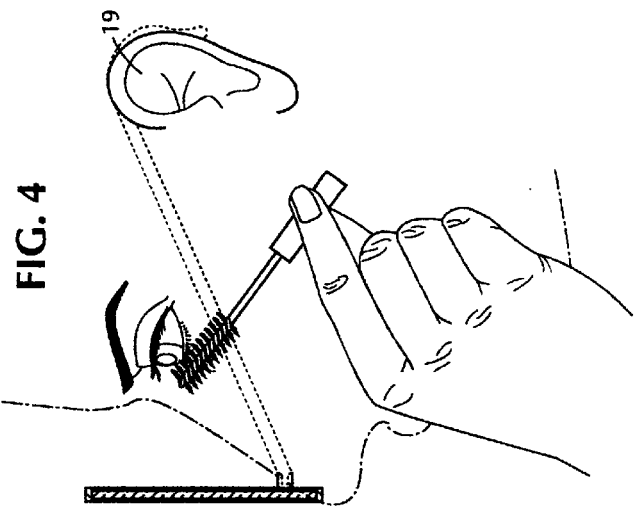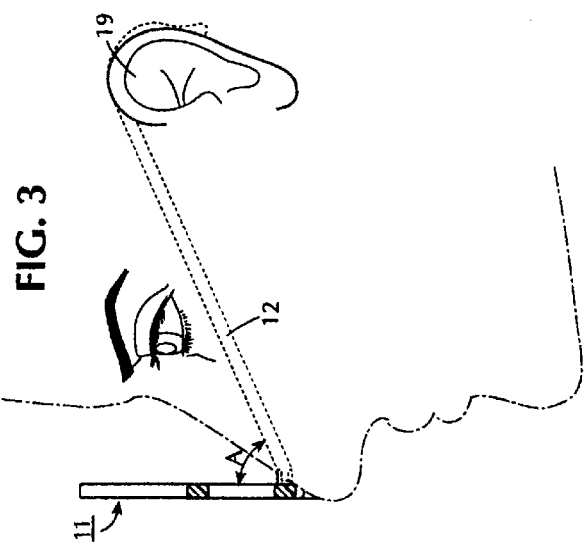

MAKEUP EYEGLASSES

This invention relates to makeup eyeglasses. More particularly, this invention relates to eyeglasses that assist a user in the application of makeup.

As is known, U.S. Pat. Nos. 6,010,215 and 6,439,718 describe makeup eyeglasses that permit a person with impaired vision to apply makeup to the eyes and surrounding face region. Various embodiments of the makeup eyeglasses are described that include adjustable nose pieces.

It is an object of this invention to provide eyeglasses for applying makeup that do not require an adjustable nosepiece.

It Is another object of the invention to provide makeup eyeglasses of relatively simple construction.

It is another object of the invention to provide a pair of makeup eyeglasses of relatively simple inexpensive construction.

Briefly, the invention provides an eyeglass frame that is constructed with a pair of lens supports for receiving a pair of eyeglass lenses and a nose rest that is located between the lens supports and near or at the bottom of the frames for resting on the nose of a user. In addition, a pair of temples are secured to opposite sides of the frame to support the frame on the ears of a user.

Each temple is hingedly secured to a respective lens support near the bottom of the frame and extends in an upwardly angled direction from the frame with an adjustable end piece for mounting on the ear of the user.

Each lens support is sized to receive a lens that has a greater height than width. In this respect, each lens may have a selected diopter of, for example 150 or 200 or 250 or any other suitable diopter.

When is use, the nose rest is rested on the nose of the user at a point that allows spacing of the lens supports away from the face and particularly the eyes of the user so that a makeup applicator, such as a brush, may be inserted, between the frame and the eyes of the user laterally of the frame without obstruction from the frame or the temples. In this respect, the frame is typically disposed in a vertical plane and the height of the lenses permits the user to look through the lenses into a mirror, mounted in a vertical plane. In any event, depending on the plane of the mirror, the user simply mounts the eyeglass frame on the user's nose in a comfortable position allowing viewing the reflection of the user's face in a normal size/image without magnification in order to apply makeup in a proper amount.

These and other objects and advantages of the invention will become more apparent from the following detailed description taken in conjunction with the accompanying drawings wherein:

FIG. 3 illustrates a view taken on line 3—3 of FIG. 1 and;

FIG. 4 illustrates a view taken on line 4—4 of FIG. 2 of the makeup eyeglasses during application of makeup to the eyelashes of a user.

Figure 1:
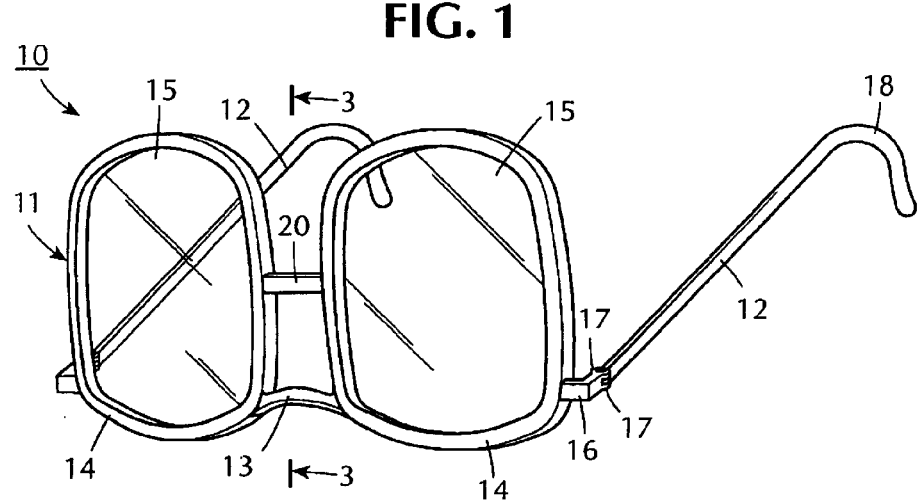
FIG. 1 illustrates a perspective view of a pair of makeup eyeglasses constructed in accordance with the invention.

Referring to FIG. 1, the makeup eyeglasses 10 includes a frame 11, a pair of temples 12 and a nose rest 13.

The frame 11 has a pair of lens supports 14 for receiving a pair of eyeglass lenses 15. As illustrated, each lens support 14 is of generally rectangular shape having a greater height than width. Likewise, each lens 15 is of a similar greater height than width.

Each temple 12 is hingedly secured to a lens support 14 at or near the bottom of the frame 11 and extends in an upwardly angled direction from the frame as indicated in FIG. 3.

As illustrated, a mounting block 16 is formed integrally with each lens support 14 for mounting a temple 12. Each block 16 has a pair of ears 17 each of which has an aperture therein.

Each temple 12 has a reduced end to fit between the ears 16 and bore (not shown) in the end that is aligned with the apertures in the ears 17 of the mounting block 16. In addition, a threaded screw or bolt is passed through the ears 17 and temple 12 in order to hingedly mount the temple 12 to the lens support 14. As illustrated, the mounting block 16 is mounted to extend laterally from the lens support 14, and is disposed to permit pivoting of a temple 12 about an axis that allows the temple 12 to fold parallel to the plane of the frame 11.

Alternatively, the mounting block 16 may be mounted to extend transversely from the lens support 14, that is to say, the mounting blocks 16 may be mounted on a back side of a lens supports 14 to facilitate folding of the temples 12 to a flattened condition.

Further, each temple 12 may have an angular end section hingedly secured to a mountable block 16 on a vertical axis while having a recolinear section extending from the angular section to an adjustable curved end piece 18.

As indicated in FIGS. 1 and 3, each temple 12 has an adjustable curved end piece 18 made of a material that can be adjusted to the shape of a user's ear 19.

The frame 11 also includes a reinforcing bar 20 that is integral with and that extends between the two lens supports 14 at about a midpoint in the height thereof.

The nose rest 13 is located below the reinforcing bar 20 and is positioned and shaped for resting on the nose of the user with the lens supports 14 spaced from the eyes of the user as indicated in FIG. 3 to permit access to the eyes of the user laterally of the frame 11 for the application of makeup as indicated in FIG. 4.

Figure 2:
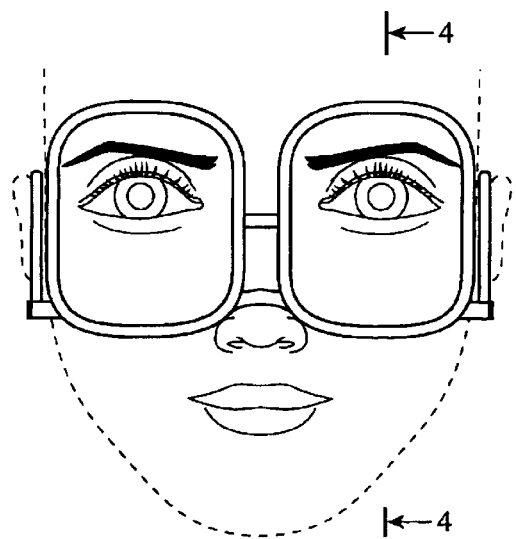
FIG. 2 illustrates a view of the makeup eyeglasses of FIG. 1 in place on a user.

Referring to FIG. 2, when in use, the nose rest 13 rests on the nose of the user. At the same time, as indicated in FIG. 3, each temple 12 extends in an upwardly angled direction from the frame 11 to permit access laterally to the eyes of the user for the application of makeup as indicated in FIG. 4.

Typically, the frame 11 is disposed in a vertical plane so that the angle A between the frame and the temple is approximately 50 to 60 degrees. In any event, the angle should be such that there is ample space for a user to apply makeup to the eyes and surrounding areas without obstruction from the frame 11 or temples 12.

As indicated in FIGS. 1 and 3, each temple 12 is secured to a lens support 14 near the bottom of the lens support 14 and approximately in the same horizontal plane as the nosepiece 13.

The nose rest 13 and end pieces 18 of the temples 12 provide a secure three-point support for supporting the makeup eyeglasses 10 on the head of the user.

The manner of hingedly securing each temple 12 to the respective lens support 14 is such as to permit the temples 12 to be folded substantially flat against the backside of the frame 11 for storage purposes. In this respect, the pivot axis of the temple would be located to the rear of the lens support 14 to permit the temples 12 to be folded flat.

Invention thus provides a pair of makeup eyeglasses of relatively simple inexpensive construction.

The invention further provides a pair of makeup eyeglasses which can be readily used and transported from place to place in a minimum of space.

What is claimed is:

1. An eyeglass construction for applying make-up about the eyes of a wearer comprising a frame having a pair of lens supports for receiving a pair of eyeglass lenses in a vertical plane;

a pair of temples, each said temple being hingedly secured to a respective lens support near a bottom of said frame and extending in an upwardly angled direction from said frame to rest on the ears of a wearer with said pair of lens supports spaced away from the face of the wearer to allow a makeup applicator to be inserted between said lenses and the eyes of the wearer; and a nose piece on said frame between said lens supports for resting on a distal end of a nose of a user with said lens supports spaced from the eyes of the user to permit access to the eyes of the user laterally of said frame for the application of makeup.

2. The combination as set forth in claim 1 wherein each lens support has a greater height than width thereof.

3. The combination as set forth in claim 1 each said temple has a rectilinear section hingedly secured to a respective support on an axis inclined to a vertical plane and an adjustable curved end piece for mounting on an ear of a user.

4. The combination as set forth in claim 3 further comprising a mounting block on each said support having a respective temple hingedly mounted thereon.

5. The combination as set forth in claim 4 wherein each said mounting block extends laterally from said respective lens support.

6. An eyeglass construction as set forth in claim 1 wherein said nose piece is disposed near a lower end of said lens supports.

7. An eyeglass construction as set forth in claim 6 further comprising a reinforcing bar integral with and extending between said lens supports at about a midpoint in the height thereof above said nosepiece.

8. An eyeglass construction as set forth in claim 6 wherein each said temple has an angular section hingedly secured to a respective support on a vertical axis, a rectilinear section extending from said angular section and an adjustable curved end piece extending from said rectilinear section for mounting on an ear of a user.

9. The combination as set forth in claim 6 further comprising a mounting block on each said support having a respective temple hingedly mounted thereon.

10. The combination as set forth in claim 9 wherein each said mounting block extends laterally from said respective lens support.

11. The combination as set forth in claim 9 wherein each said mounting block extends transversely from said respective lens support.

* * * * *